Dec. 19, 1961    E. B. HECKENKAMP    3,013,617
TRACTOR-IMPLEMENT FLUID OPERATED WEIGHT TRANSFER SYSTEM
Filed March 17, 1960    3 Sheets-Sheet 1

Inventor
Edward B. Heckenkamp
by John P. Hines
Attorney

United States Patent Office 3,013,617
Patented Dec. 19, 1961

3,013,617
TRACTOR-IMPLEMENT FLUID OPERATED
WEIGHT TRANSFER SYSTEM
Edward B. Heckenkamp, Wauwatosa, Wis., assignor to
Allis-Chalmers Manufacturing Company, Milwaukee,
Wis.
Filed Mar. 17, 1960, Ser. No. 15,732
2 Claims. (Cl. 172—8)

This invention pertains to tractor-implement combinations in general and more particularly to a hydraulic weight transfer system for such a combination.

The usual hydraulic weight transfer system for a tractor implement combination includes a force transmitting connection between fluid motor actuated tractor lift arms and a tractor propelled implement. The weight transfer is effected when the tractor lift arms exert a lifting force on the implement. This causes a portion of the implement weight to be carried by the drive wheels of the tractor thereby increasing the traction of these wheels.

This invention is an improvement of one particular type of weight transfer system disclosed in United States application Serial No. 718,714 of W. F. Strehlow, filed March 3, 1958, now Patent No. 2,981,342. In the preferred embodiment of this particular type of weight transfer system the tractor is provided with three large capacity fluid delivery pumps and one relatively small capacity fluid delivery pump. The fluid output from all pumps is delivered to a common control valve which is selectively movable to direct the flow of fluid from one or more pumps to a fluid motor or to bypass the fluid to a reservoir. A resilient draft transmitting connection is provided between the tractor and propelled implement. A motion transmitting connection is provided between the resilient draft transmitting connection and the control valve. This motion transmitting connection transposes an increase in draft force on the tractor into a movement of the control valve which in turn causes an increased fluid pressure in the fluid motor thereby causing an increased lifting force to be exerted on the implement resulting in a transfer of a portion of the implement weight to the drive wheels of the tractor.

One desirable feature of this type of weight transfer system is that the output from all of the pumps is regulated by a common control valve. The control valve can be moved to a full lower position wherein all pumps are delivering fluid to the reservoir and the fluid is allowed to escape from the motor permitting the implement to be lowered. By moving the control valve a predetermined amount any fluid in the motor is blocked from the reservoir thereby holding the tractor lift arms in an extended position. Additional movement of the control valve directs the output from the small pump to the motor while the three large pumps are still connected in fluid communication to the reservoir. Each of the three large pumps can be progressively connected in fluid communication to the motor until all four pumps are connected to the motor. With this arrangement a large or small volume of fluid is available to quickly or slowly activate the motor.

This type of system is desirable in many respects, however, it does have certain undesirable characteristics. Let us assume that a plow is being propelled through the ground at the desired working depth and the control valve is in the full lower position providing a fluid path between the fluid motor and the reservoir. When an increased draft is imposed on the tractor as a result of a change in soil condition, the motion transmitting linkage connecting the implement to the control valve causes the control valve to move to block the fluid connection between the motor and the reservoir. Additional movement is required to direct the output from the small pump to the motor to exert a lifting force on the implement causing a transfer of weight from the implement to the tractor. With this arrangement there is an unnecessary delay in time from the moment the plow encounters the changed soil condition to the moment there is a lifting force exerted on the implement. This delay in time is caused by providing a separate displacement of the control valve for blocking the fluid in the motor from the reservoir and then requiring additional displacement of the control valve to direct pressurized fluid from the small pump to the fluid motor. This delay in time is undesirable as the difficult soil condition may become more severe before any weight transfer is effected causing an overloading of the tractor engine.

The proportioning of the displacement of the control valve which results in the delay in time referred to above also indirectly causes, in some instances, the undesirable characteristic of an implement known as hunting. When an implement cycles above and below its predetermined working depth resulting, in the case of a plow, in an undulating furrow bottom, the implement is said to be hunting. If a plow is being propelled by a tractor equipped with the above identified weight transfer system and an increased draft load is experienced, the motion transmitting linkage must move the control valve to block the return passage from the motor to the reservoir before any weight transfer is effected. This draft load may be sufficient to cause the control valve to activate one of the larger pumps. The larger pump in effect delivers too much fluid too fast so that the system overcorrects. That is, the plow will be shallowed more than is necessary to balance the increased draft. When the plow is shallowed too much, the draft is decreased causing the system to lower the plow. This process of hunting is repeated as the system "hunts" for the proper setting to balance the depth of the plow with the draft load. If only the smaller capacity pump were activated, the plow, due to the small volume of fluid delivered, would slowly shallow until the draft, weight transfer and plow depth were balanced.

Applicant proposes a hydraulic weight transfer system wherein the small capacity pump is brought into pressure operation slightly before the control valve entirely closes the passageway between the hydraulic motor and the reservoir. This is accomplished by directing the output from the small capacity pump into a passageway in fluid communication with the fluid motor and the control valve. The output from the small pump is directed to the reservoir when the valve is open. When the valve is moved toward a closed position the output from the small capacity pump is throttled through the valve causing an increase in fluid pressure in the fluid motor passageway. This affords the desirable quick response of the small pump to an increase in draft load on the tractor and furthermore provides additional displacement of the control valve for controlling the small capacity pump before the larger capacity pumps are brought into pressure operation. Since the small pump does not have sufficient capacity to quickly lift the plow it will cause the plow to be slowly shallowed until the depth of the plow is balanced with the draft and the system will not overcorrect causing the plow to hunt.

It is therefore a general object of the invention to provide a tractor implement combination with a hydraulic system having an implement lift feature and a weight transfer feature including two pumps of different fluid delivery capacity wherein the smaller capacity pump controls the weight transfer feature for normal operation and the larger capacity pump controls the abnormal or emergency operations and the implement lift feature.

Another object of the invention is to provide a tractor implement combination with a hydraulic system of the hereinbefore described type wherein the output from the larger capacity pump is directed to a control valve for selective delivery to a reservoir or a hydraulic motor and the output from the smaller capacity pump is directed to a passageway connecting the control valve and fluid motor in fluid communication.

The foregoing and other objects and advantages of the invention will become fore fully apparent from the following description of the invention shown in the accompanying drawings.

Referring to the drawings in which like reference characters designate the same or similar parts of the various views.

Figure 1:
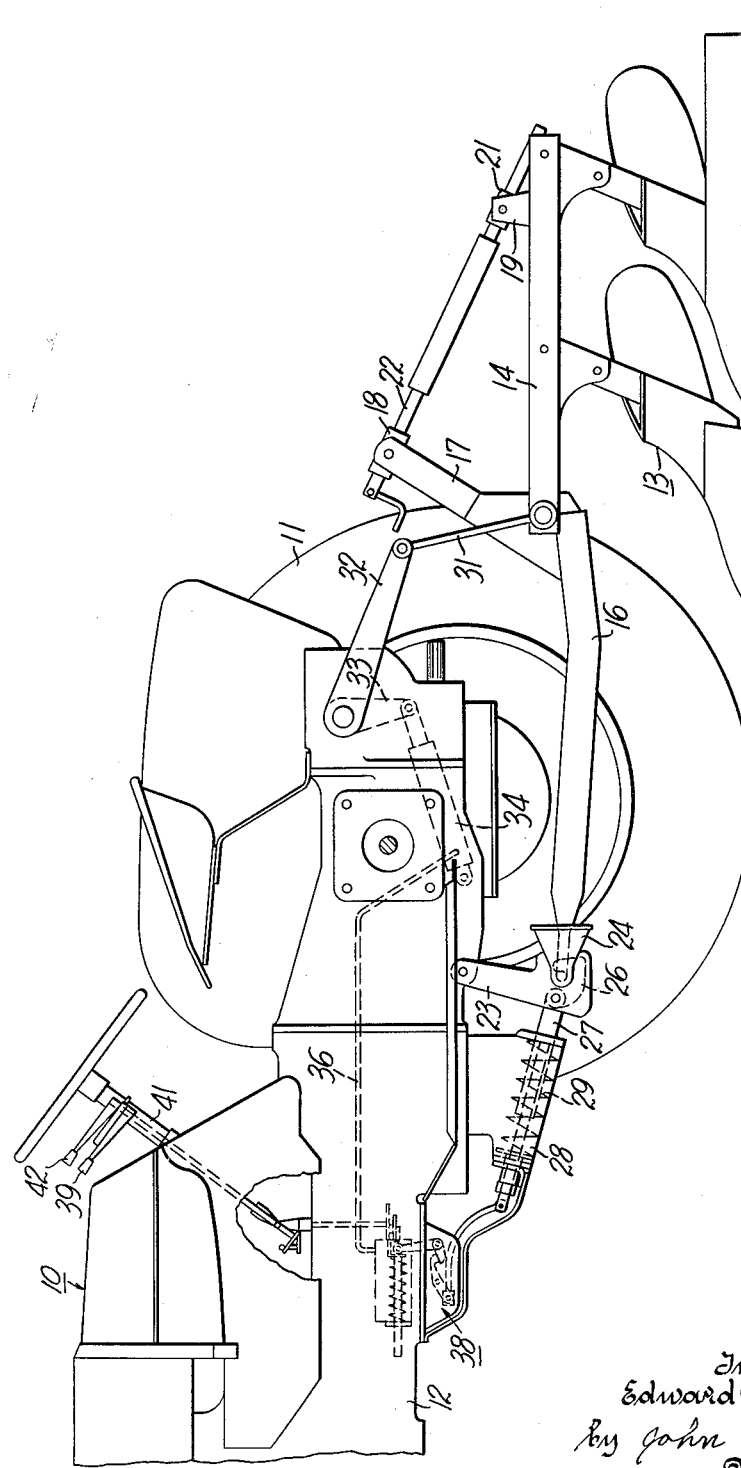
FIG. 1 is a side elevation of a tractor implement combination with parts of the tractor removed.

Referring to FIG. 1, a vehicle or farm tractor generally designated 10 is shown having rear traction wheels 11 and a tractor frame 12. Attached to the tractor in a rearwardly extending position is a ground working implement or two bottom plow generally designated 13. The ground working implement is composed of two plow bottoms which are both rigidly connected in any conventional manner to a plow beam 14. The plow beam is pivotally connected to a drawbar member 16. An upstanding bracket 17 rigidly connected to the drawbar 16 pivotally supports a threaded sleeve 18. An additional bracket 19 formed on the implement frame 14 pivotally supports an additional threaded sleeve 21. An elongated beaming screw 22 is passed through each threaded sleeve 18 and 21 thereby providing an adjustable rigid connection between the implement frame and the drawbar. The beaming screw varies the angle between the plow beam 14 and the drawbar 16 to adjust the plow to seek a predetermined working depth as it is propelled through the ground.

A support 23 rigidly fixed in depending relation to the under side of the tractor frame 12 has a bell housing 24 formed thereon which opens in a rearwardly extending direction. A hook 26 pivotally connected to a rod 27 is positioned within the bell housing 24. The rod 27 is supported for reciprocating movement in a spring housing 28. A compression spring 29 is provided in the housing 28 in a preloaded condition connected between the rod and the housing and resists rearward movement of the rod 27. The forward end of the drawbar 16 has an eye formed thereon for engagement with the hook 26. The forward end of the drawbar is guided into the bell housing and slips over the hook providing a draft transmitting connection between the plow and the tractor.

The plow 13 also has a nondraft transmitting connection with the tractor. The lower end of a lift rod 31 is connected to the plow at the pivot connection between the plow beam 14 and the drawbar 16. Because of the beaming screw connection between the plow beam and the drawbar, the plow and drawbar can be lifted as a unit pivoting about the connection of the drawbar to the hook member 26. The upper end of the lift rod 31 is connected to a lift arm 32 which is journaled on the tractor frame. A crank arm 33 is connected to the lift arm 32 in any conventional manner so that both arms move as a unit. A hydraulic motor 34 is rigidly supported on the tractor frame and connected to the lower end of the crank arm 33 for actuation thereof. Actuation of the fluid motor or ram moves the lift arm 32 which in turn exerts a lifting force on the implement 13 through the lift rod 31.

A hydraulic ram 34 is actuated by pressure fluid delivered through conduit 36 from pressure fluid delivery pumps generally designated 37. A control valve associated with the pumps varies the volume of fluid delivered to the ram. The control valve is in turn controlled by two sources. The first source of control is a weight transfer or motion transmitting linkage generally designated 38 which connects the spring biased rod 27 to the control valve. This weight transfer linkage transposes a change in the draft load on the tractor into movement of the control valve. If the draft load increases the control valve allows fluid to enter the hydraulic ram resulting in a lifting force being exerted on the plow. If the draft load is decreased the control valve allows some of the fluid to escape from the ram and the lifting force being exerted on the implement is decreased.

A second source of control for the hydraulic control valve is a hand lever 39 mounted on the tractor steering column 41. This hand or lift and lower lever 39 is selectively positionable to cause the control valve to allow fluid to be pumped to the hydraulic ram resulting in a lifting of the implement. This lever is also positionable to cause the control valve to allow fluid to escape from the ram resulting in a lowering of the implement. A second or weight transfer lever 42 is also positioned on the tractor steering column and is selectively positionable to vary the amount of displacement required of the rod 27 to move the control valve to a particular position.

Figure 2:
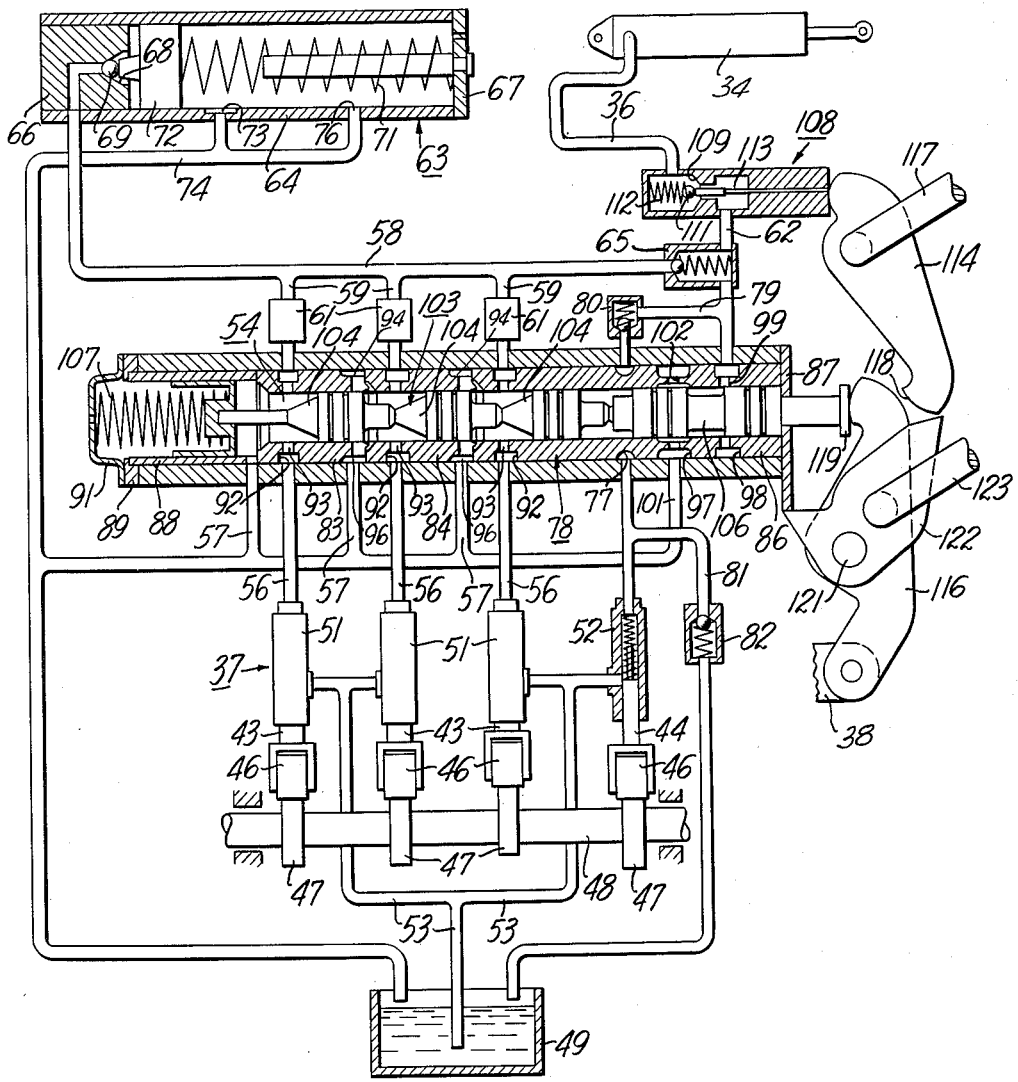
FIG. 2 is a schematic showing of the tractor hydraulic system.

Referring to FIG. 2, the hydraulic pump 37 is preferably of the constant delivery multiple piston type. The pump pistons 43 and 44 are connected to cam follower rollers 46 which are in turn activated by cams 47 mounted on a rotating shaft 48 which is driven by the tractor engine. Fluid from a reservoir 49 is delivered to the pump cylinders 51 and 52 through the intake passages 53. Fluid flows into each pump cylinder when the pistons 43 and 44 are in the lowered position and as the pistons are driven upward by the cams the intake passages are closed off and the fluid is pressurized. The pressurized fluid from the three large cylinders 51 is directed to the control valve chamber 54 through pump discharge passages 56. Adjacent to each discharge passage is a bypass passage 57 which connects the control valve chamber with the fluid reservoir 49. In the preferred embodiment a pressure manifold 58 is connected with the control valve chamber 54 through a group of transfer passages 59 equal in number to the number of large pump pistons 43. Each transfer passage is provided with a spring biased ball check valve 61. These valves require only a minimum amount of pressure to open the transfer passages from the valve chamber to the manifold 58. The pressure manifold is in turn connected in fluid communication with a working fluid passage 62. Communication between the working fluid passage and the pressure manifold is controlled by another spring biased ball check valve 65 preventing the back flow of fluid from the working fluid passage to the manifold.

The pressure manifold 58 is also connected in fluid communication with an unloading valve generally designated 63. Any conventional type of unloading valve may be used wherein the valve is initially opened at a relatively high pressure and is retained in an open position at a low pressure. The preferred form of unloading valve disclosed herein for illustration comprises a cylindrical casing 64 closed at one end by a plug 66 and at its other end by an end plate 67 having a breather hole therethrough. A valve seat 68 is provided in the plug 66 to receive a ball valve 69. The ball valve 69 is biased to a closed position by a compression spring 71 which acts upon a piston 72 contained in fluid sealing sliding relation within the unloading valve casing 64 and in abutting relation to the ball valve 69. A relatively high fluid pressure is required to compress the spring 71 and unseat the ball valve 69 because of the small area of the ball valve which is exposed to the pressurized fluid in the system. Once the ball valve is moved from its seat the pressurized fluid acts on the piston 72. Due to the relatively larger area of the piston 72, the pressure of the fluid acting on the piston that is required to compress the spring 71 is much lower than the pressure of the fluid acting on the ball that is required to compress the spring. Furthermore, since the biasing effect of the spring 71 acts through the piston 72, the ball valve will remain open at the lower pressure required to move the piston against the biasing effect of the spring. As the piston 72 is moved to the right it uncovers port 73 which connects the unloading valve and therefore the pressure manifold to the fluid reservoir through the passage 74. Any fluid which might seep beyond the piston 72 returns to the reservoir through the additional fluid port 76 provided in the unloading valve.

The discharge from the small pump cylinder 52 does not enter the control valve chamber 54 but is bypassed around this chamber by the annular groove 77 provided in the control valve liner 78. This annular groove connects the output from the small pump cylinder directly to the working fluid passage 62 through passage 79. A conventional ball check valve 80 is provided in the passage 79 to block the return flow of fluid to the small pump cylinder 52.

The discharge of the small pump cylinder 52 is connected in fluid communication with the fluid reservoir 49 through a relief passage 81. Operatively interposed in this relief passage is a conventional pressure relief valve 82 which limits the maximum pressure of the output fluid from the small pump cylinder.

As shown in FIG. 2, the control valve comprises the cylindrical liner 78 having axially separable sections 83, 84 and 86 disposed in end abutting relation with the righthand section 86 abutting a cover plate 87. A cylindrical spacer sleeve 88 disposed in the lefthand end of the control valve abuts the lefthand liner section 83 and an end plate 89. The end plate is held in position by a cover plate 91 attached to the lefthand end of the control valve.

The cylindrical liner sections are each provided with an annular groove 92 placing the large pump discharge passages 56 in fluid communication with the diametrically opposed transfer passages 59 and through these passages with the pressure manifold 58. In addition, each liner section 83, 84 and 86 is provided with a transverse bore 93 placing the control valve chamber 54 in communication with the annular grooves 92. The end abutting portions of each liner section are complementary shaped to form annular grooves 94 and transverse bores 96. These annular grooves and transverse bores place the control valve chamber 54 in fluid communication with the bypass passages 57. In addition, the righthand liner section 86 is provided with two annular grooves 97 and 98. Annular groove 98 communicates with the working fluid passage 62 and with the control valve chamber 54 through a transverse bore 99. Annular groove 97 communicates with a main return passage 101 which is in fluid communication with the fluid reservoir 49 and also with the control valve chamber 54 through a transverse bore 102.

A cylindrical control valve plunger generally designated 103 is positioned in the cylindrical liner sections for sliding movement relative thereto. A separate valve plunger element 104 is provided for each large pump. An additional valve plunger element 106 is provided in the righthand end of the cylindrical control valve liner section 86 for coaction with the annular grooves 97 and 98. This cylindrical control valve element 106 controls the flow of fluid through the groove 98 from the working fluid passage 62 to the main return passage 101. The control valve elements 104 and 106 are maintained in end abutting relation by a compression spring 107 disposed in the cylindrical spacer sleeve 88.

In the working fluid passage between the control valve and the hydraulic ram 34 is positioned a manually controllable ball check valve generally designated 108. This check valve or hold positioning valve is composed of a housing having a valve seat 109 formed therein. A ball valve 111 is urged into seating relation with the valve seat by a spiral compression spring 112. A plunger 113 slidably received within the hold positioning valve housing is selectively movable to force the ball valve 111 from its seat as shown in FIG. 2.

Actuation of the main control valve is provided by a pair of control levers 114 and 116. Lever 114 is connected to the lift and lower hand lever 39 by an elongated rod 117. By moving the control lever 114 in a counterclockwise direction (as viewed in FIG. 2) the manually controllable check valve 108 is opened allowing fluid to flow through its valve from the hydraulic ram 34. The lever 114 has a striking surface 118 which is selectively movable into and out of engagement with a button 119 formed on an extension of the control valve plunger element 106. When lever 114 is moved to force the ball valve 111 from its seat it allows the control valve plunger 103 to move to the right under the urging of the spring 107. This opens the valve effecting fluid communication between the working fluid passage 62, through the control valve, with the fluid reservoir 49 resulting in a lowering of the implement.

An adjustable pivot 121 is provided for the weight transfer lever 116. This pivot is formed on a swingable link 122 which is connected to the weight transfer hand lever 42 through the rod 123. By moving the hand lever 42 the pivot 121 can be swung closer to or further away from the button 119 of the control valve plunger element 106. This causes a lesser or greater displacement of the weight transfer lever 116 before displacement of this lever results in movement of the control valve plunger 103.

Figure 3:
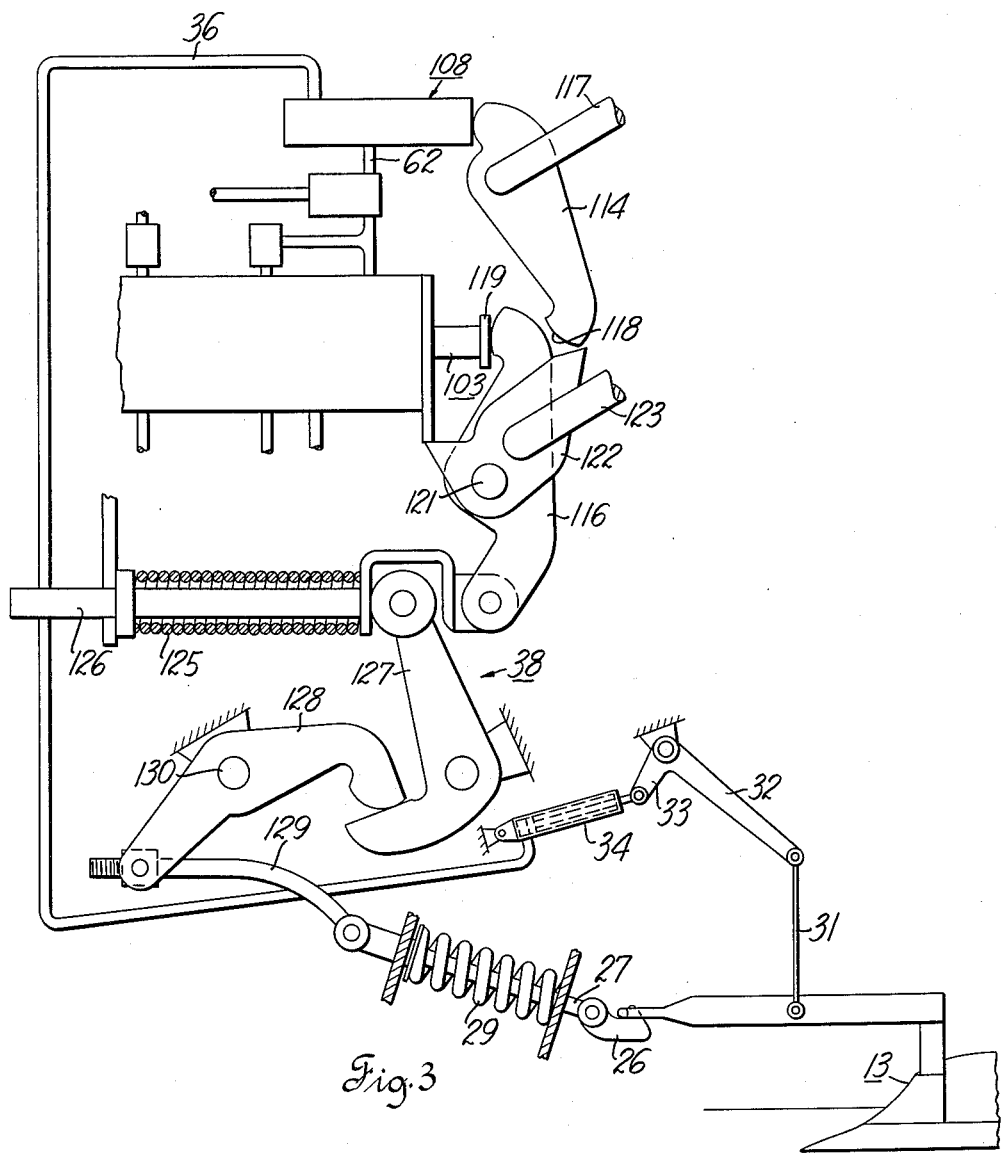
FIG. 3 is a schematic view showing motion transmitting linkage providing a connection between the implement and the hydraulic system control valve.

Referring to FIG. 3, automatic weight transfer is provided by the weight transfer control lever 116 acting on the control valve plunger 103. Actuation of the lever 116 is provided through the weight transfer linkage generally designated 38. A plunger 126 pivotally connected to the lower end of weight transfer lever 116 is urged to the right as viewed in FIG. 3 by a compression spring 125. A lever 127 in contact with the plunger 126 is urged thereby into contact with a cam lever 128. The cam lever 128 has one end connected to a link 129 which is connected to the rod 27. An increased load on the plow 13 tends to rotate the cam lever 128 in a counterclockwise direction about its pivot 130. Lever 127 follows cam lever 128 as the former rotates in a lockwise direction under urging from the spring biased plunger 126. Movement of the spring biased plunger to the right results in counterclockwise rotation of the weight transfer lever 116 about its pivot point 121 into engagement with the control valve plunger button 119.

The operation of the subject invention will now be described. As shown in FIGS. 2 and 3, the lift and lower control lever 114 has been moved to a full lower position wherein the hold positioning valve 108 is held open allowing fluid to flow in either direction through the working fluid passage 62. The lower striking surface 118 of lever 114 has allowed the spring 107 to move the control valve plungers to the right connecting the working fluid passage with the reservoir and allowing all fluid to escape from the hydraulic ram, effecting a lowering of the plow. If it is desired to lift the implement, the operator need only move the lift and lower hand control lever 39 (FIG. 1) to a raise position which causes the striking surface 118 of the lever 114 to move the control valve plunger 103 to the left causing pressurized fluid to be directed from the three larger pumps through the control valve into the working fluid passage and fluid from the small pump to bypass the control valve into the working fluid passage. Since the return passage 101 is blocked, fluid from the small pump as well as the three larger pumps will be directed to the ram causing a raising of the implement. When the ram 34 reaches the limit of its stroke the pressure of the fluid in the pressure manifold 58 exceeds the unloading valve opening pressure and the ball 69 is moved off the seat exposing the larger area of piston 72 to pressure. The piston 72 will move to the right until the fluid can pass to reservoir through groove 73, conduit 74. Check valve 65 prevents fluid from flowing from the ram to reservoir through the unloading valve and thus the ram will be maintained in its extended condition. The small pump 52 will continue to be in fluid communication with the ram 34 to supply make up oil in case of leakage. A fuller discussion of the operation of an unloading valve in a weight transfer system is contained in my United States Patent 2,926,496, issued March 1, 1960, on a hydraulic pump.

With the system in the full lower position as shown in FIG. 2 and the plow in the ground causing a draft load to be exerted on the tractor which is near the maximum desired without weight transfer, the operator moves the hand control weight transfer lever 42 so that the lever 116 is just contacting the button 119 of the control valve plunger 103. In this position the full output of the three large plungers is being directed into the control valve chamber and back through the bypass passages 57 to the reservoir 49. The output from the small pump is being directed through the annular groove 77 around the control valve into the working fluid passage 62 and back through the control valve and the main return line 101 to the fluid reservoir. With the implement in the ground as shown in FIG. 3, any increase in draft on the implement will result in a counterclockwise movement of the cam lever 128 allowing the plunger 126 to move to the right causing a counterclockwise movement of the weight transfer lever 116 moving the control valve plunger to the left. As the control valve plunger is moved to the left, the transverse bore 99 is partially blocked causing a throttling of the fluid flowing therethrough. This causes the pressure of the fluid in the working fluid passage to rise and it can be seen that there is an immediate and gradual increase of weight transfer from the plow to the tractor. With this gradual increase in pressure and therefore in the amount of lifting force on the implement, the plow will not be shallowed beyond the depth which will balance the draft load with the weight transfer and therefore the plow will not hunt.

It will be apparent to those skilled in the art that various changes and modifications may be made in the embodiment of the invention illustrated and described herein without departing from the spirit of the invention or from the scope of the appended claims.

What is claimed is:

1. A fluid operated weight transfer system for a tractor and propelled implement combination including a draft sensing connection between said tractor and said implement comprising: a pair of pumps driven by said tractor, one of said pumps having a smaller fluid delivery capacity than the other of said pumps; a fluid reservoir; a pressure fluid operated motor connected to said tractor and attached to said implement for exerting a lifting force on said implement; fluid control means; a working fluid passage connecting said fluid control means and said motor in fluid communication; a first passage bypassing said fluid control means and connecting said one of said pumps in fluid communication with said working fluid passage; fluid passage means connecting said other of said pumps, said fluid control means and said reservoir in fluid communication; a one way valve between said working fluid passage and said fluid passage means permitting fluid flow from said fluid passage means to said working fluid passage and preventing flow in the opposite direction; and motion transmitting means providing a connection between said draft sensing connection and said fluid control means, said control means being selectively movable by said motion transmitting means to interrupt and establish fluid communication between said working fluid passage and said reservoir when said other of said pumps is connected in fluid communication to said reservoir.

2. A fluid operated weight transfer system for a tractor and propelled implement combination including a draft sensing connection between said tractor and said implement comprising: a pair of pressure fluid delivery pumps driven by said tractor, one of said pumps having a smaller pressure fluid delivery capacity than the other of said pumps; a fluid reservoir; a pressure fluid operated motor connected to said tractor and attached to said implement for exerting a lifting force on said implement; a control valve chamber; a working fluid passage connecting said valve chamber and said motor in fluid communication; a return passage connecting said valve chamber in fluid communication with said reservoir; a first passage bypassing said valve chamber and connecting the output of said one of said pumps in fluid communication with said working fluid passage; a second passage connecting the output of said other of said pumps in fluid communication with said valve chamber; a third passage connecting said valve chamber in fluid communication with said working fluid passage; a bypass passage connecting said valve chamber in fluid communication with said reservoir; a one way valve between said third passage and said working fluid passage permitting flow of fluid from said third passage to said working fluid passage and preventing flow in the opposite direction; a control valve member movably received in said valve chamber; and motion transmitting means providing a connection between said draft sensing connection and said control valve member, said control valve member being movable by said motion transmitting means to interrupt and establish fluid communication between said working fluid passage and said return passage when said other of said pumps is connected in fluid communication to said bypass passage.

References Cited in the file of this patent

UNITED STATES PATENTS

| | | |
|---|---|---|
| 2,583,197 | Armington | Jan. 22, 1952 |
| 2,611,307 | Strehlow et al. | Sept. 23, 1952 |